July 11, 1933.  P. S. EDWARDS ET AL  1,917,245
PHOTOGRAPHING
Filed Oct. 8, 1929
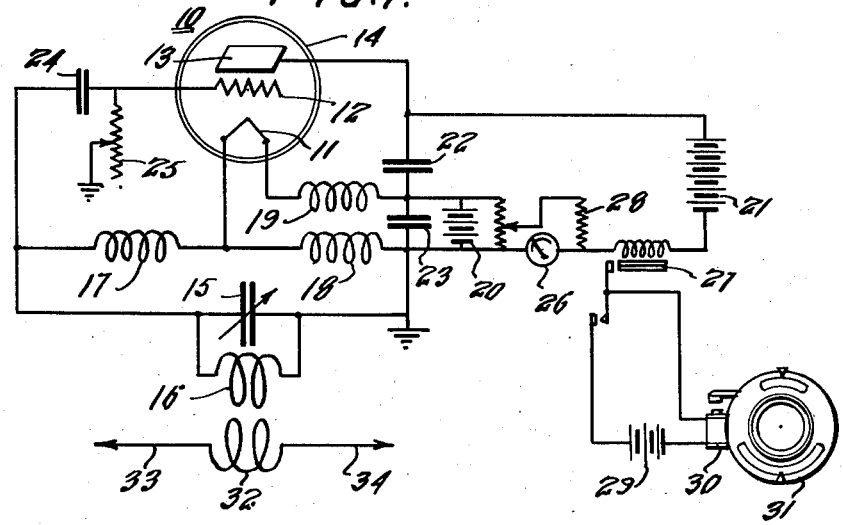
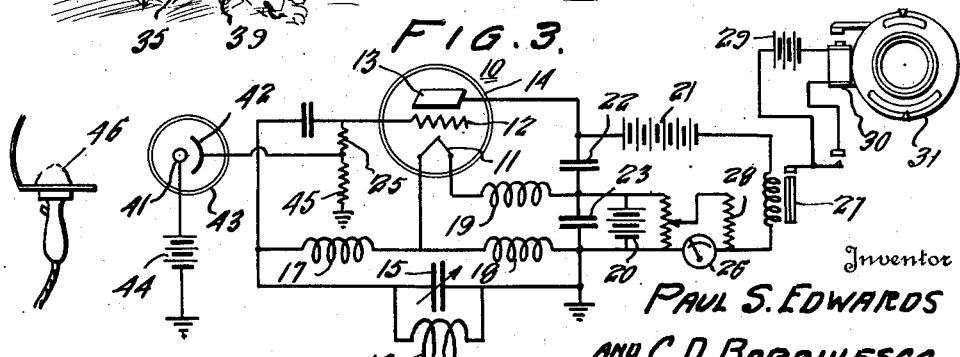
Inventor
PAUL S. EDWARDS
AND C. D. BARBULESCO
By
Semmes & Semmes
Attorneys Patented July 11, 1933

1,917,245

UNITED STATES PATENT OFFICE

PAUL S. EDWARDS, OF FORT MEADE, MARYLAND, AND CONSTANTIN D. BARBULESCO, OF DAYTON, OHIO

PHOTOGRAPHING

Application filed October 8, 1929. Serial No. 398,257.

(GRANTED UNDER THE ACT OF MARCH 3, 1883, AS AMENDED APRIL 30, 1928; 370 O. G. 757)

The invention described herein, if patented, may be manufactured and used by or for the Government for governmental purposes, without the payment to us of any royalty thereon.

This invention relates to photographing and more particularly to means for correlating action with the movement of the shutter of a camera.

In photography, particularly in night photography, it is desirable to operate the camera at an instant when the maximum active value of the light of a magnesium flare is present, the rapidity of the explosion of the magnesium flare is so great that an ordinary hand flash and an electrical relay mechanism are ordinarily incapable of adjustment to the exact moment of the desired exposure. Furthermore, in remote controlled night photography where the subject to be photographed may be in transit and appears at an unknown time, it is not possible with the apparatus now in general use to obtain the exposure at the psychological time. This is particularly so in photographing wild animals.

The present invention comprehends means for correlating the movement of the subject to be photographed with the photographing process.

It is the aim of the present invention to overcome these difficulties by the provision of a self-modulated high frequency oscillator of great sensitiveness associated with a special circuit having a relay connected therein and an antenna coupled to the circuit, so that any movement of mass through the electrostatic field surrounding the antenna will cause a change in the reactance in the circuit causing a corresponding change in the plate current which actuates the relay.

An object of the invention is to provide means for correlatitng action with a photographic process.

Another object of the invention is to provide means for timing the action of a camera by the occurrence of some particular event.

A further object of the invention is to secure exact coordination between the action of a camera with the occurrence of some particular event.

Other objects of the invention will appear from the following description taken in connection with the drawing, which forms a part of the specification, and in which:

Figure 1 is a schematic view of the circuit employed in connection with the invention.

Figure 2 illustrates a practical commercial embodiment of the invention,

Figure 3 is a modified form of the circuit.

Referring to the drawing for more specific details of the invention, 10 represents generally a vacuum tube having a filament 11, a grid 12 and a plate 13 enclosed within an evacuated envelope or container 14.

Connected to the input and output circuits of the tube is a low loss tank circuit comprising a large variable capacitance 15 and a small inductance 16. The value of this capacity and inductance determine and control the frequency at which the tube oscillates.

Connected to the filament 10 are high frequency choke coils 17 and 18. These are composed of a relatively large number of turns of wire and are connected respectively in the grid and plate circuit of the tube.

When in operation, these choke coils introduce or generate two driving electromotive forces which may be considered substantially 180° out of phase. The geometric sum of these separate electromotive forces introduce and maintain a heavy oscillating current in the circuit. A third choke coil 19 is connected to the filament and serves to maintain it at high potential with respect to the ground.

The electrical supply for the tube comprises a filament battery 20 and a plate battery 21 both of which are maintained at ground potential, and bypass condensers 22 and 23 of large value permitting circulation of high frequency currents are connected in the plate circuit.

The frequency at which the tube operates is controlled mainly by the value of the condenser 15 and the inductance 16. The condenser 15 is of large value and hence the interelectrode capacity of the tube becomes substantially negligible in effect.

Connected in the grid circuit is a grid condenser 24 and a leak resistance 25. The value of the condenser and resistance is so chosen that the high frequency oscillations generated in the tank circuit will periodically charge the condenser up to a certain value and then discharge through the leak resistance to the ground. Therefore, the condenser 24 and the resistance 25 produce a periodic interruption or chopping of the high frequency oscillations.

Connected in the output circuit of the tube is a meter 26 and a relay 27. The meter 26 is connected with a potentiometric arrangement 28 which opposes the current flowing from the filament to the plate battery, and the relay is adapted to close a secondary circuit.

The secondary circuit includes a battery 29, an electrical relay such as the electromagnet 30 and a device 31 to be actuated or controlled, such as the shutter of a camera or the trigger of a piece of ordnance.

Inductively coupled to the tank circuit is an exterior circuit comprising a coupling or loading coil 32 and conductors 33 and 34. This coupling may be utilized for inducing losses in the tank circuit so as to increase the frequency of the periodic oscillations and effect a corresponding increase in the value of the plate current.

Figure 2 illustrates a practical commercial embodiment of the circuit illustrated in Figure 1. As shown, the circuit is enclosed in a suitable casing 35 and the exterior circuit comprising the loading coil 32 and conductors 33 and 34, has its loading coil 32 enclosed in the casing and suitably connected as by a lead 36 to an antenna 37 of any preferred type stretched between suitable supports and properly insulated therefrom as indicated at 38.

The relay 27 is enclosed within the casing 35, and is actuated by changes in the plate circuit to close and open the secondary circuit including the battery 29, the solenoid 30 and the device to be operated. As shown, in Figure 2, the electromagnet is arranged to operate the shutter of a camera 39.

In Figure 3, there is shown a modified form of the invention wherein a change in the reactance of the circuit is effected by a photoelectric cell. As shown, there is provided a photo-electric cell comprising electrodes 41 and 42 enclosed within a container 43. This cell may have a platinum anode and a cathode of a suitable responsiveness to light effects. The cathode, for example, may consist of sodium or potassium or a mixture of these. The cell may be placed in a darkened container provided with means for the admission of light.

The photo-electric cell is connected in series with a battery 44 and a resistance at 45. The resistance is so chosen as to be of the order of the internal impedance of the cell. This resistance is mounted in series with resistance 25 and a source of light 46 adapted to be manually controlled is mounted adjacent to the photo-electric cell.

By means of the delicate oscillatory circuit and the photo-electric cell connected thereto in the manner above described, the movement of the shutter of the camera is caused at the same time as the operation of the light, so that exposure will be made concomitantly with the flash of the light.

While preferred embodiments of the invention have been described, it is to be understood that these are given merely as examples of the underlying principles of the invention, and since these may be incorporated in other specific mechanical structures, we do not intend to be limited to those shown except as such limitations are clearly imposed by the appended claims.

Having thus described the various features of the invention, what we claim as new and desire to secure by Letters Patent, is:—

1. In combination with a camera, a self-modulated radio frequency oscillator, an antenna connected to the input circuit thereof and means for operating the camera connected in the plate circuit of the oscillator.

2. In combination with a camera, a self-modulated radio frequency oscillator, an antenna coupled with the input circuit of the oscillator and a device connected in the plate circuit of the oscillator adapted to operate the camera.

3. In combination with a camera, a self-modulated radio frequency oscillator, an antenna inductively connected thereto, a relay connected in the plate circuit of the oscillator and a circuit including an electromagnet for operating the camera connected to the relay.

4. The combination with a camera, a self-modulated radio frequency oscillator, an antenna inductively coupled to the oscillator, a relay connected in the plate circuit of the oscillator, a circuit connected to the relay including an electromagnet and a shutter adapted to be operated by the electromagnet.

5. In combination with a camera, a self-modulated high frequency oscillator of the electronic tube type, a tank circuit comprising a low inductance, large capacitance and low losses connected across the grid and plate of the oscillator, a coil between the filament and grid and a second coil between the filament and plate of the oscillator, an external circuit inductively coupled to the tank circuit, a relay connected in the plate circuit of the oscillator and a circuit including an electromagnet and a shutter adapted to be operated by the electromagnet.

6. In combination with a camera, an electronic tube oscillator producing high frequency oscillations modulated at audio frequency, a tank circuit having a low loss coil and condenser connected between the plate and grid of the oscillator, a plate circuit connected to the oscillator having a relay connected therein, a circuit including an electromagnet connected to the relay, a shutter adapted to be operated by the electromagnet and an open oscillating circuit inductively coupled to the tank circuit.

7. In combination with a camera, a high frequency electronic tube oscillator in which the high frequency oscillations are modulated at audio frequency, a tank circuit of low loss connected between the grid and plate of the oscillator, a plate circuit in which the mean value of the current is dependent upon the values of the modulated frequency, a relay connected in the plate circuit, a circuit including an electrically responsive device connected to the relay, a shutter operated by the device and an open oscillating circuit inductively coupled to the tank circuit.

8. In combination with a camera a high frequency electronic tube oscillator adapted to produce high frequency oscillations modulated at audio frequency, a tank circuit of low loss connected between the grid and plate of the tube, a plate circuit in which the mean value of the current is dependent upon the values of the audio frequency, an external oscillating circuit coupled to the tank circuit having a natural frequency close to the frequency of the high frequency oscillations, a relay connected in the plate circuit, a circuit including an electromagnet connected to the solenoid and means associated with the electromagnet for operating the camera.

9. An apparatus for governing the movement of the shutter of a camera by the movement of an object to be photographed, comprising an electronic tube oscillator in which the high frequency is modulated at audible frequency, a tank circuit of low losses connected thereto, a plate circuit, means in the plate circuit operable by variation of the intensity of the stationary electrostatic field established by a radiating circuit coupled to the tank circuit, and a photo-electric cell connected in the grid circuit of the oscillator adapted to be affected by external light.

10. An apparatus for governing the movement of the shutter of a camera by the movement of an object to be photographed, comprising a high frequency oscillator of the electronic tube type adapted to produce high frequency oscillations modulated at audible frequency, a tank circuit of low losses connected between the grid and plate of the tube, a plate circuit including means for actuating the shutter of the camera, and a photo-electric cell connected in the grid circuit adapted to be affected by external light.

11. An apparatus for timing the movement of the shutter of a camera by the movement of an object to be photographed comprising a high frequency oscillator of the electronic tube type adapted to produce high frequency oscillations modulated at audible frequency, a tank circuit of low loss connected thereto, a grid condenser and resistance connected in the grid circuit of the oscillator, a resistance connected in series with the first mentioned resistance, and a photo-electric cell connected in the series with the last mentioned resistance adapted to be affected by external light.

12. An apparatus for timing the movement of the shutter of a camera by the movement of an object to be photographed comprising a high frequency oscillator of the electronic tube type adapted to produce high frequency oscillations modulated at audible frequency, a tank circuit of low loss connected thereto, a plate circuit, means connected in the plate circuit for operating the shutter of the camera, and an element connected in the grid circuit whose impedance changes upon exposure to greater light than normal and operates to bias the grid of the tube.

In testimony whereof we affix our signatures.

PAUL S. EDWARDS.
CONSTANTIN D. BARBULESCO.